Patented Dec. 9, 1941

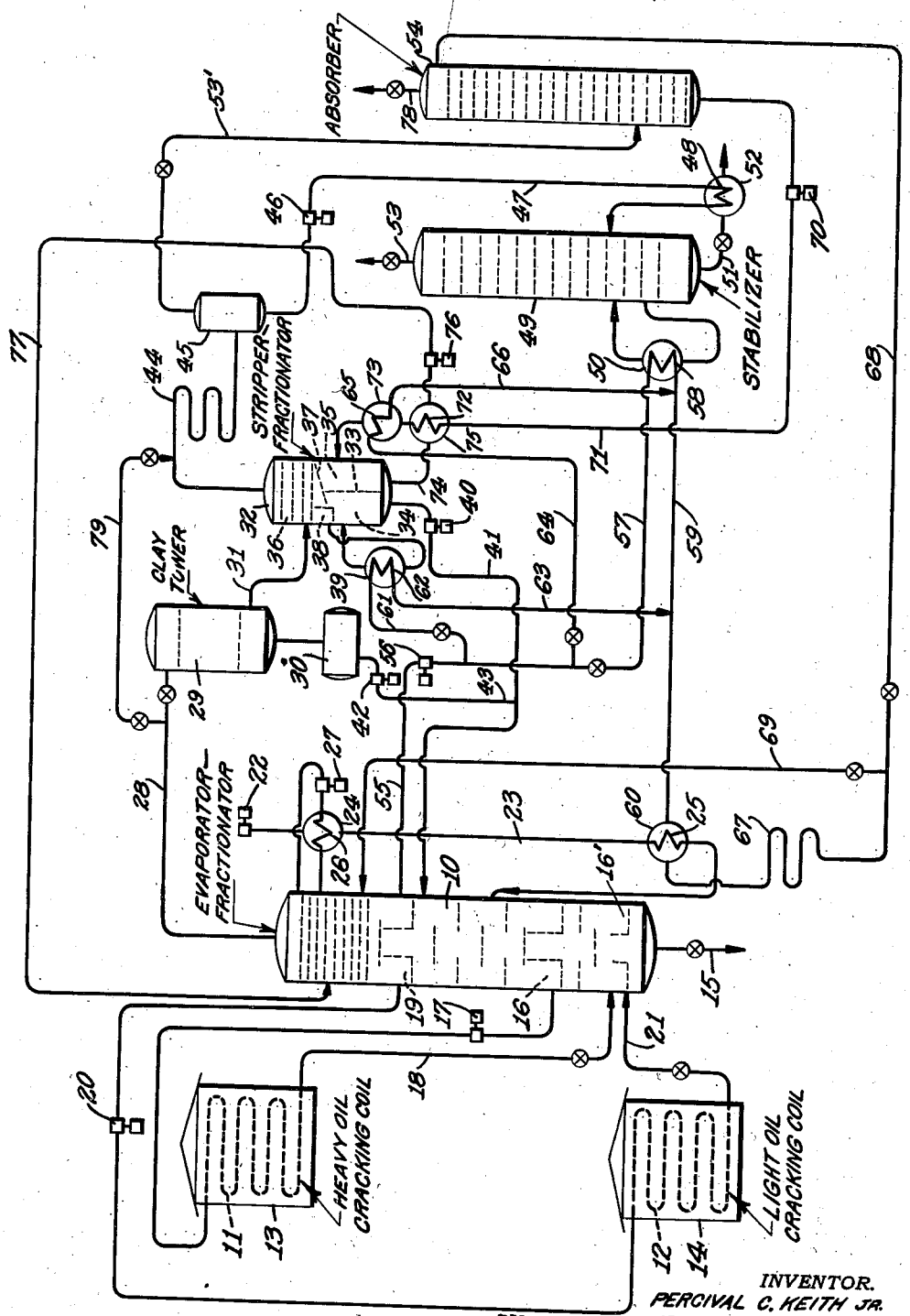

2,265,968

UNITED STATES PATENT OFFICE 2,265,968

TREATMENT OF HYDROCARBONS

Percival C. Keith, Jr., Peapack, and Joseph Warren Jewell, Summit, N. J., assignors to Gasoline Products Company, Inc., Jersey City, N. J., a corporation of Delaware Application January 26, 1940, Serial No. 315,664

8 Claims. (Cl. 196—8)

This invention relates to the cracking of hydrocarbons and has particular reference to certain novel improvements in methods of recovering the cracked products.

The invention contemplates a process wherein hydrocarbon oil is subjected to cracking and the cracked products fractionated to recover a desired gasoline or motor fuel product, and wherein a condensate obtained in the fractionation of the cracked vapors is utilized as an absorbent menstruum to recover desirable constituents from uncondensed constituents, the absorbent menstruum containing absorbed hydrocarbons subjected to a stripping operation to remove lighter constituents and the absorbent menstruum thus stripped of lighter components returned to the fractionating zone.

The invention contemplates furthermore a process in which the cracked vapors are fractionated to remove heavier components and the fractionated vapors subjected to treatment with an adsorbent clay or material adapted to effect polymerization of relatively unstable constituents and in which the treated vapors are subjected to condensation or fractionation to separate a condensate fraction from uncondensed constituents, the uncondensed constituents scrubbed with a condensate obtained from the cracked vapors, the enriched condensate subjected to stripping to separate lighter constituents which are combined with the clay treated products, while the stripped condensate is returned to the fractionating zone in which the cracked products are fractionated. By removing the lighter components from the enriched absorber oil prior to returning it to the fractionating zone, the quantity of vapors to be treated in the fractionating zone and in the clay treating zone is materially reduced.

In accordance with the invention hydrocarbon oil is subjected to cracking and the cracked products separated into vapors and residue. The vapors are fractionated to produce a vapor fraction comprising essentially gasoline hydrocarbons and this vapor fraction is passed through a clay treating zone to effect polymerization of unstable constituents. The treated vapors are passed to an after-fractionator to remove higher boiling polymer products and the fractionated vapors are subjected to condensation and passed to a separator in which the distillate separates from a normally gaseous hydrocarbon fraction which will usually contain a certain amount of normally condensable hydrocarbons. The distillate is passed to a stabilizer for rectification, the gaseous fraction is passed to an absorber wherein it is contacted with an absorbent menstruum for recovering the higher boiling components contained in the gaseous fraction. Reflux condensate is withdrawn from the fractionator and after being cooled is introduced into the absorber as the absorbent menstruum. The enriched condensate is then passed to a stripping zone for the recovery of lighter components including constituents in the gasoline boiling range and these lighter components are combined with the stream of cracked products beyond the clay treating zone so that they may be thus combined with the distillate product while the stripped condensate is cycled back to the fractionating zone. In accordance with the invention the condensate withdrawn from the fractionating zone is passed through heat exchangers to effect the reboiling of liquid in the after-fractionator and in the stabilizer and through a heat exchanger in the stripping zone in which the rich absorbent oil is stripped. The reflux condensate which has been cooled in these heat exchanger operations may then be further cooled by contact with the charging stock to the cracking system and after such further cooling as may be required is directed to the absorber as the absorbent menstruum therein.

A particular object of the invention is to provide a process adapted for processing crude oil which may contain gasoline of relatively high anti-knock quantity and requiring no reforming and to accomplish the fractionation of the crude oil into the desired fractions for cracking, as well as the fractionation of the cracked products, in such a way that gasoline constituents may be substantially eliminated from the cracking zone.

For the purpose of more fully disclosing the invention reference is now made to the accompanying drawing which is a flow diagram illustrating apparatus adapted for practicing the invention.

In the drawing 10 represents a combination evaporator and fractionating tower and 11 and 12 designate heating or cracking coils suitably mounted in furnaces 13 and 14, respectively, adapted for supplying the necessary heat for cracking. The tower 10 is provided with conventional bubble trays, disc and doughnut trays, or the like, and with such heating or reboiling means, as may be needed to accomplish the desired fractionation. Separation of vapors from residue takes place in the lower portion of the tower 10, the residue being withdrawn through a line 15. Trap-out tray 16 is provided for the collection of higher boiling condensate which may be cycled by a pump 17 to the heating coil 11 from which the heated products pass through a transfer line 18 to the lower portion of the tower 10. A trap-out tray 19 is provided for the collection of lighter condensate which may be cycled by a pump 20 to heating coil 12 from which the heated products pass through a transfer line 21 to the lower portion of the tower 10. It is advantageous to discharge the cracked products from cracking coils 11 and 12 onto a tray 16' for separation into vapors and residue. A charging stock such as crude petroleum or topped or reduced crude is directed by a pump 22 through a charging line 23 to the section of the fractionating tower above the tray 16 so that commingled unvaporized charging stock and reflux condensate may be directed to the cracking coil 11. Interposed in the charging line 23 are heat exchange elements 24 and 25 for preheating the charging stock. Reflux condensate may be withdrawn from an upper portion of the tower 10 through an element 26 in heat exchange with the element 24 and is cycled by a pump 27 back to the tower as a top reflux to control the end point of the vapors leaving the tower.

The vapors from the tower 10 pass through a vapor line 28 to a clay treating tower 29 in which the vapors are contacted with fullers' earth or other adsorbent material adapted for polymerizing unstable constituents. The resultant liquid polymer products collect in an accumulating tank 30 while the vapors pass through a line 31 to a tower 32. In the lower portion of the tower a vertical baffle 33 is provided to form two evaporating or distilling zones 34 and 35 in which the separated liquids are kept separate while the separated vapors pass freely to a common fractionating zone 36 in the upper portion of the tower. A baffle 37 may be provided for preventing reflux condensate from dropping into separator 35 and diverting it to the separator 34. A tray 38 is adapted to receive reflux condensate from the fractionating zone 36. The vapor line 31 communicates with this fractionating zone. Reflux condensate from tray 38 is passed through heat exchange element 39 thence to the separator 34 to accomplish reboiling of the condensate. In the tower 32 the vapors entering through line 31 which may contain polymer products produced by the treatment in the tower 29 are subjected to refractionation together with vapors from the separating zone 35, the source of which is explained hereinafter, and liquid or condensate of higher boiling point than desired for the overhead product from the tower is withdrawn by pump 40 and directed through a line 41 to the tower 10 together with the liquid polymers which are withdrawn from the tank 30 by a pump 42 and passed through a line 43 to the line 41. It is advantageous to introduce the polymer liquid to the tower 10 below the tray 19.

The uncondensed vapors pass from the tower 32 to a condenser coil 44 thence to an accumulating drum 45 in which the condensate separates from uncondensed vapors and gases. The condensate is withdrawn from the drum 45 by a pump 46 and directed through a line 47, in which is a heat exchange element 48, to a rectifying tower 49 which is provided with suitable fractionating elements and with cooling and refluxing means to accomplish the desired rectification of the distillate. Reflux condensate from the tower 49 is cycled through an element 50 of a heat exchanger to effect reboiling of the condensate. The rectified product is withdrawn through line 51 thence through an element 52 in heat exchange with the element 48, while uncondensed constituents are removed through a line 53.

The uncondensed vapors and gases pass from the gas separator 45 through a line 53' to an absorber tower 54. Reflux condensate is withdrawn from tray 19 of tower 10 through a line 55 and is directed by a pump 56 through a line 57 to an element 58 in heat exchange with element 50 to accomplish reboiling of the condensate from the stabilizer 49. The reflux condensate cooled in heat exchange element 58 passes through a line 59 to an element 60 in heat exchange with element 25 in the charging line, for preheating the charging stock and for the further cooling of the reflux condensate. The line 57 has a branch line 61 extending to an element 62 in heat exchange with element 39 for reboiling condensate from the fractionating zone 36. The condensate cooled in the heat exchange element 62 passes through a line 63 to the line 59. The line 57 has another branch line 64 which extends to a heat exchange element 65 thence through a line 66 to the line 59. The condensate thus cooled in heat exchange elements 62 and 65 is thus combined with the condensate cooled in heat exchange element 58 for passage to the exchanger 60 for further cooling. The cooled condensate flows from exchanger 60 through an additional cooling means 67 thence through a line 68 to the absorber 54. A branch line 69 is provided for directing to the fractionating tower 10 such portion of the condensate as may not be needed in the absorber.

The enriched absorber oil is drawn from the tower 54 by a pump 70 and passed through a line 71 thence through heat exchange element 72, thence through an element 73 in heat exchange with element 65, thence to the separating zone 35 wherein vapors separate from liquid, the separated vapors passing to the fractionating section 36. The liquid is withdrawn from separator 35 through a line 74, thence through an element 75 in heat exchange with element 72, thence to a pump 76 by which the cooled liquid is directed through a line 77 to the tower 10. It is advantageous to introduce this cooled liquid into the fractionating section of the tower 10 above the tray 19. Uncondensed constituents are removed from the absorber 54 through a line 78.

When it is desired to omit the clay treating step carried on in tower 29 the vapors leaving the tower 10 to line 28 may be by-passed through a line 79 thence to the condenser coil 44.

In practicing the invention with the apparatus illustrated the charging stock such as crude petroleum or topped crude is preheated in heat exchangers 24 and 25 and the preheated charge is introduced into the primary vapor fractionating section of the tower 10 above the tray 16. The charging stock is subjected to additional heating in the tower by reason of the upwardly rising vapors which separate from the cracked products in the lower portion of the tower. Commingled unvaporized charging stock and heavy reflux condensate is withdrawn from tray 16 and subjected to desired cracking conditions of temperature and superatmospheric pressure in the heating coil 11 while lighter or intermediate reflux condensate withdrawn from tray 19 is subjected to desired cracking conditions of temperature and superatmospheric pressure in the heating coil 12, the resulting cracked products being separated into vapors and residue in the vapor separating zone of the tower 10. It is preferable to maintain comparatively moderate superatmospheric pressures such as 100 to 200 lbs. in the tower 10. The overhead temperature of the tower is controlled to take off as vapors a fraction of desired boiling range which is subjected to treatment with the adsorbent material in the tower 29 to effect polymerization of unstable hydrocarbons. The treated vapors pass to the fractionating section 36 of the tower 32 where refractionation is accomplished with the aid of the heated vapors rising from the separating zones 34 and 35. The overhead temperature of the section 34 is controlled to take off as vapors the gasoline or naphtha fraction of desired end point which fraction is subjected to condensation in cooler 44 and the resulting distillate is collected in gas separator 45. The distillate is subjected to rectification in the stabilizer 49 normally under higher pressures than obtain in the gas separator 45 while the uncondensed constituents comprising normally gaseous hydrocarbons together with certain amounts of normally liquid hydrocarbons are passed to the absorber 54. The polymers produced by the treatment with the adsorbent material in the clay tower 29 and which collect in the drum 30 are returned to the tower 10 together with the liquid which separates in the separating zone 34 which liquid includes constituents of higher boiling point than desired for the overhead fraction from the fractionating section 36. A portion of the reflux condensate collecting in tray 19 is withdrawn by pump 56 and passed in a stream through heat exchanger 58 to supply heat for rectifying the distillate in the stabilizer 49. A portion of this stream is diverted to heat exchange element 62 for supplying heat to the fractionating operation being conducted in the fractionating section 36 of tower 32 while another portion of the stream is diverted to heat exchange element 65 for heating the enriched absorber oil which is being passed to the separating zone 35 and for supplying additional heat to the fractionating section 36. The reflux condensate which has been thus cooled in heat exchangers 62, 65 and 58 is subjected to further cooling in exchange element 60 and to such additional cooling in cooling coil 67 as may be required. Such portion of the cooled condensate as is required in the absorber 54 is directed thereinto for absorbing higher boiling hydrocarbons contained in the stream of uncondensed constituents which enter the absorber from the receiving drum 45, the remainder of the cooled condensate being refluxed in the tower 10. The enriched oil containing the absorbed hydrocarbons is withdrawn from the absorber 54 and after heating in exchange elements 72 and 65 is directed into the vapor separating zone 35 which is suitably maintained at a temperature adequate to distill off the gasoline constituents. The stripped absorber oil is cycled back to the tower 10.

In an example of the invention a crude oil containing gasoline is preheated in exchangers 24 and 25 to a temperature of 370° F. and introduced into the tower 10 which is maintained at 100 lbs. pressure. Admixed unvaporized charging stock and heavy reflux condensate at a temperature of 750° F. is withdrawn from tray 16 and subjected to a temperature of 925° F. under 200 lbs. pressure in the heating coil 11. Reflux condensate is withdrawn from tray 19 at a temperature of 640° F. and is subjected to a temperature of 1010° F. under 750 lbs. pressure in heating coil 12. The products from the cracking coils separate into vapors and residue in the tray 16' at a temperature of 830° F., the distillation being aided with steam introduced into the bottom of the tower from which the residue is withdrawn at a temperature of 750° F. The overhead vapors which comprise cracked gasoline as well as gasoline from the crude pass from the tower 10 at a temperature of 420° F. to the clay treating tower 29. The treated vapors pass from the clay tower at a temperature of 428° F. to the fractionating section 36, the overhead distillate from which is collected in receiving drum 45 at a temperature of 100° F. under 80 lbs. pressure. Condensate withdrawn from tray 19 of tower 10 at a temperature of 640° F. is cooled in exchange element 62 to a temperature of 500° F., condensate passed through exchange element 65 is cooled to 480° F. and condensate passed through exchange element 58 is cooled to 500° F. The condensate thus cooled in these heat exchangers is further cooled to a temperature of 430° F. in exchange element 60 and is finally cooled in the cooler 67 to a temperature approximating 100° F. at which temperature the condensate enters the absorber 54. The absorber has a top temperature of 100° F. and a bottom temperature of 125° F. under 75 lbs. pressure. The enriched absorber oil is raised to a temperature of 285° F. in heat exchanger 72 and is further heated to a temperature of 500° F. in the exchanger element 73. A temperature of about 500° F. is maintained in the separating zone 35 and a temperature of 475° F. in the separating zone 34. The stripped absorber oil withdrawn from separator 35 is cooled in the exchanger element 75 to a temperature of 350° F. and is cycled back to the tower 10. The distillate from the receiving drum 45 is heated in exchanger element 48 to a temperature of 325° F. for introduction to the stabilizer 49 which is maintained under a pressure of 350 lbs. with a top temperature of 145° F. and a bottom temperature of 460° F. The rectified gasoline product is withdrawn through line 51.

Although a preferred embodiment of the invention has been described herein, it will be understood that various changes and modifications may be made therein, while securing to a greater or less extent some or all of the benefits of the invention, without departing from the spirit and scope thereof.

We claim:
1. The process of treating hydrocarbons that comprises subjecting hydrocarbon oil to cracking, fractionating the cracked products in a fractionating zone to separate residual products, reflux condensate and a vapor fraction comprising gasoline constituents, passing said vapor fraction into contact with adsorbent material to effect polymerization of relatively unstable constituents, conducting the treated vapors to a second fractionating zone wherein the vapors are fractionated to separate gasoline vapors from higher boiling condensate, subjecting said vapors to condensation and collecting the resultant products in a separator wherein uncondensed hydrocarbons separate from liquid distillate, directing uncondensed hydrocarbons from said separator to an absorbing zone, cooling reflux condensate from the first fractionating zone and introducing the cooled condensate into said absorbing zone as an absorbent menstruum; stripping the resultant menstruum containing absorbed hydrocarbons to remove lighter constituents; directing lighter constituents so removed to said second fractionating zone and conducting the stripped absorbent menstruum to the first fractionating zone.

2. The process of treating hydrocarbons that comprises subjecting hydrocarbon oil to cracking, fractionating the cracked products in a fractionating zone to separate residual products, reflux condensate and a vapor fraction comprising gasoline constituents, passing said vapor fraction into contact with adsorbent material to effect polymerization of relatively unstable constituents, conducting the treated vapors to a second fractionating zone wherein the vapors are fractionated to separate gasoline vapors from higher boiling condensate, subjecting said vapors to condensation and collecting the resultant products in a separator wherein uncondensed hydrocarbons separate from liquid distillate, passing the liquid distillate to a rectifying zone wherein it is subjected to rectification, directing uncondensed hydrocarbons from said separator to an absorbing zone, cooling reflux condensate from the first fractionating zone and introducing the cooled condensate into said absorbing zone as an absorbent menstruum, stripping the resultant menstruum containing absorbed hydrocarbons to remove lighter constituents, directing lighter constituents so removed to said second fractionating zone and conducting the stripped absorbent menstruum to the first fractionating zone.

3. The process of treating hydrocarbons that comprises subjecting hydrocarbon oil to cracking conditions of temperature and pressure in a cracking zone, separating resultant cracked products into vapors and residue, passing the separated vapors successively to primary and secondary fractionating zones, cycling resultant reflux condensate from said secondary fractionating zone to said cracking zone, passing vapors and gases uncondensed in the secondary fractionating zone comprising gasoline hydrocarbons to a refining zone wherein the vapors and gases are subjected to treatment with an adsorbent material to effect polymerization of relatively unstable constituents, separating resultant higher boiling polymer products from lower boiling components comprising gasoline constituents and normally gaseous hydrocarbons, returning the separated polymer products to the products of cracking at a point prior to said secondary fractionating zone, separating said lower boiling components into a liquid product and a fraction comprising normally gaseous hydrocarbons, bringing said fraction comprising normally gaseous hydrocarbons into contact in an absorbing zone with liquid condensate withdrawn from the aforesaid secondary fractionating zone to effect absorption of higher boiling constituents of said fraction, passing the resultant enriched condensate to a stripping zone wherein lighter components of the enriched condensate are distilled off, directing the resultant stripped condensate to said secondary fractionating zone, and combining said lighter components distilled off the enriched condensate with the aforesaid gasoline constituents separated from said higher boiling polymer products.

4. The process of treating hydrocarbons that comprises subjecting hydrocarbon oil to cracking, fractionating the cracked products in a fractionating zone to separate residual products, reflux condensate and a fraction comprising gasoline constituents, collecting said fraction comprising gasoline constituents as a distillate in a separator wherein uncondensed constituents separate from liquid distillate, passing said liquid distillate to a rectifying zone wherein it is subjected to rectification, directing said uncondensed constituents to an absorbing zone, cooling reflux condensate from said fractionating zone and introducing resultant cooled reflux condensate into said absorbing zone as an absorbent menstruum, withdrawing from the absorbing zone the resultant menstruum containing absorbed hydrocarbons, stripping the menstruum containing absorbed hydrocarbons to recover lighter constituents comprising gasoline constituents, combining gasoline constituents thus recovered with the liquid distillate passed to the rectifying zone for rectification and conducting the stripped absorbent menstruum to said fractionating zone.

5. The process of treating hydrocarbons that comprises subjecting hydrocarbon oil to cracking, fractionating the cracked products in a fractionating zone to separate residual products, reflux condensate and a vapor fraction comprising gasoline constituents, passing said vapor fraction into contact with adsorbent material to effect polymerization of relatively unstable constituents, conducting the treated vapors to a second fractionating zone wherein the vapors are fractionated to separate gasoline vapors from higher boiling condensate subjecting said vapors to condensation and collecting the resultant products in a separator wherein uncondensed hydrocarbons separate from liquid distillate, passing the liquid distillate to a rectifying zone wherein it is subjected to rectification, directing uncondensed hydrocarbons from said separator to an absorbing zone, bringing a portion of the reflux condensate from the first fractionating zone into heat exchange with higher boiling condensate in the second fractionating zone to effect reboiling of such condensate, bringing another portion of the reflux condensate from the first fractionating zone into heat exchange with liquid in said rectifying zone to effect reboiling thereof, introducing an absorbent menstruum into said absorbing zone, withdrawing the resultant menstruum containing absorbed hydrocarbons from said absorbing zone and bringing another portion of the reflux condensate from the first fractionating zone into heat exchange therewith and effect removal of lighter constituents therefrom, directing lighter constituents so removed to said second fractionating zone, conducting the resultant stripped absorbent menstruum to the first fractionating zone, combining the resultant cooled reflux condensate from the aforesaid heat exchange operations and directing at least a portion of the resulting mixture to said absorbing zone as the aforesaid absorbent menstruum.

6. The process of treating hydrocarbons in which hydrocarbon oil is subjected to cracking and the cracked products separated into vapors and residue that comprises subjecting the separated vapors to fractionation in a primary fractionating zone to separate vapors comprising gasoline constituents from higher boiling reflux condensate, subjecting the latter vapors to treatment with an adsorbent material to effect polymerization of relatively unstable constituents, conducting the treated vapors to a second fractionating zone wherein the vapors are fractionated to separate gasoline vapors from higher boiling condensate, subjecting said vapors to condensation and passing the resultant products to a separator wherein uncondensed hydrocarbons separate from distillate, directing said distillate to a rectifying zone wherein the distillate is subjected to rectification to produce a rectified product, passing said uncondensed hydrocarbons to an absorber wherein said uncondensed hydrocarbons are contacted with a liquid menstruum to effect absorption of a portion of said uncondensed hydrocarbons, passing the menstruum containing absorbed hydrocarbons to a heat exchange zone for heating and directing the resultant heated products into a separating zone wherein liquid separates from vapors and gases, passing resultant separated vapors and gases to said second fractionating zone and directing resultant separated liquid to the primary fractionating zone, bringing a portion of the reflux condensate from the primary fractionating zone into heat exchange with higher boiling condensate from said second fractionating zone to heat the same, directing the resultant heated higher boiling condensate into another separating zone wherein vapors separate from liquid and passing the separated vapors to said second fractionating zone, passing another portion of the reflux condensate from the primary fractionating zone to a heat exchanger for heat exchange with the menstruum containing absorbed hydrocarbons to heat the same, bringing another portion of the reflux condensate from the primary fractionating zone into heat exchange with liquid in said rectifying zone to effect reboiling thereof, combining the resultant cooled reflux condensate from the aforesaid heat exchange operations, subjecting the mixture to additional cooling and directing reflux condensate thus additionally cooled to said absorber as the aforesaid liquid menstruum.

7. The process of treating hydrocarbons in which hydrocarbon oil is subjected to cracking in a cracking zone, the cracked products separated into vapors and residue and the separated vapors fractionated in a fractionating zone to separate vapors comprising gasoline constitutentes from higher boiling reflux condensate for cycling to the cracking zone, which comprises subjecting the latter vapors to treatment with an adsorbent material to effect polymerization of relatively unstable constituents, conducting the treated vapors to a second fractionating zone wherein the vapors are fractionated to separate gasoline vapors from higher boiling condensate, subjecting said vapors to condensation and passing the resultant products to a separator wherein uncondensed hydrocarbons separate from distillate, directing said distillate to a rectifying zone wherein the distillate is subjected to rectification to produce a rectified product, passing said uncondensed hydrocarbons to an absorber wherein said uncondensed hydrocarbons are contacted with a liquid menstruum to effect absorption of a portion of said uncondensed hydrocarbons, passing the menstruum containing absorbed hydrocarbons to a heat exchange zone for heating and directing the resultant heated products into a separating zone wherein liquid separates from vapors and gases, passing resultant separated vapors and gases to said second fractionating zone and directing resultant separated liquid to the primary fractionating zone, bringing a portion of said reflux condensate from the first mentioned fractionating zone into heat exchange with higher boiling condensate in the second fractionating zone to effect reboiling thereof, passing another portion of the reflux condensate from the first-mentioned fractionating zone to a heat exchanger for heat exchange with the menstruum containing absorbed hydrocarbons to heat the same, bringing another portion of the reflux condensate from the first-mentioned fractionating zone into heat exchange with liquid in said rectifying zone to effect reboiling thereof, combining the resultant coiled reflux condensate from the aforesaid heat exchange operations, bringing the mixture into heat exchange with charging stock to effect cooling of the mixture and heating of the charging stock, directing the heated charging stock to the first-mentioned fractionating zone subjecting said mixture to further cooling and directing the further cooled reflux condensate to said absorber as the aforesaid liquid menstruum.

8. The process of treating hydrocarbons that comprises subjecting hydrocarbon oil to cracking, fractionating the cracked products to separate residual products, reflux condensate and a vapor fraction comprising gasoline constituents, passing said vapor fraction into contact with adsorbent material in a refining zone to effect polymerization of relatively unstable constituents, separating resultant higher boiling polymer products from lower boiling components comprising gasoline constituents and normally gaseous hydrocarbons, separating said lower boiling components into a fraction comprising liquid gasoline constituents and a fraction comprising normally gaseous hydrocarbons, directing said fraction comprising liquid gasoline constituents to a rectifying zone wherein it is subjected to rectification to produce a rectified product, bringing said fraction comprising normally gaseous hydrocarbons into contact in an absorbing zone with reflux condensate obtained in the aforesaid fractionation of the cracked products, passing the resultant enriched condensate to a stripping zone wherein lighter components of the enriched condensate are distilled off and combining lighter components distilled off the enriched condensate with gasoline constituents from the aforesaid refining zone for rectification therewith.

PERCIVAL C. KEITH, Jr.
JOSEPH WARREN JEWELL.